US010452733B2

(12) United States Patent
Behm

(10) Patent No.: US 10,452,733 B2
(45) Date of Patent: Oct. 22, 2019

(54) SEMANTIC LOCATION AND PROXIMITY OF MAPS

(71) Applicant: Google Inc., Mountain View, CA (US)

(72) Inventor: Andreas Behm, San Jose, CA (US)

(73) Assignee: Google LLC, Mountain View, CA (US)

( * ) Notice: Subject to any disclaimer, the term of this patent is extended or adjusted under 35 U.S.C. 154(b) by 529 days.

(21) Appl. No.: 15/259,093

(22) Filed: Sep. 8, 2016

(65) Prior Publication Data

US 2018/0067952 A1 Mar. 8, 2018

(51) Int. Cl.
G06F 16/00 (2019.01)
G06F 16/9537 (2019.01)
G06F 16/44 (2019.01)
G06F 16/29 (2019.01)

(52) U.S. Cl.
CPC .......... *G06F 16/9537* (2019.01); *G06F 16/29* (2019.01); *G06F 16/444* (2019.01)

(58) Field of Classification Search
CPC .... G06F 16/9537; G06F 16/29; G06F 16/444; G06T 11/206
See application file for complete search history.

(56) References Cited

U.S. PATENT DOCUMENTS

| 7,197,500 B1* | 3/2007 | Israni | G01C 21/32 340/995.14 |
| 8,604,977 B2* | 12/2013 | Wilfert | G06F 16/9537 342/450 |
| 9,424,358 B2* | 8/2016 | Chang | G06F 16/9535 |
| 9,607,092 B2* | 3/2017 | Kreitler | G06F 16/9537 |
| 2007/0011150 A1* | 1/2007 | Frank | G06F 16/9537 |
| 2008/0262717 A1* | 10/2008 | Ettinger | G01C 21/3476 701/467 |
| 2010/0268720 A1* | 10/2010 | Spivack | G06F 17/2785 707/756 |
| 2012/0232791 A1* | 9/2012 | Sterkel | B64D 11/0015 701/454 |
| 2014/0316736 A1* | 10/2014 | Strohbach | H04L 67/12 702/127 |

(Continued)

OTHER PUBLICATIONS

Liu et al., "Extracting Semantic Location from Outdoor Positioning Systems", Proceedings of the 7th International Conference on Mobile Data Management, Nara, Japan, May 10-12, 2006, p. 73.

*Primary Examiner* — Leslie Wong
(74) *Attorney, Agent, or Firm* — Dority & Manning, P.A.

(57) ABSTRACT

The present disclosure provides systems and methods that determine a semantic location of a map and/or determine a proximity between maps. One example computer system is configured to: obtain information descriptive of a plurality of content locations respectively associated with a plurality of items of content included in a map; identify a set of content cells based at least in part on the plurality of content locations respectively associated with the plurality of items of content included in the map; determine a plurality of sets of feature cells respectively for a plurality of semantic entities; compare the set of content cells to the respective sets of feature cells for at least a portion of the plurality of semantic entities; and select at least one of the plurality of semantic entities as a semantic location for the map based at least in part on the comparison.

15 Claims, 11 Drawing Sheets

(56) References Cited

U.S. PATENT DOCUMENTS

| | | | |
|---|---|---|---|
| 2015/0149080 A1* | 5/2015 | McCarthy | G06T 15/005 701/430 |
| 2015/0248192 A1* | 9/2015 | Katragadda | G06F 16/951 715/771 |
| 2017/0300456 A1* | 10/2017 | Rimmer | G06F 17/248 |

* cited by examiner

SEMANTIC LOCATION AND PROXIMITY OF MAPS

FIELD

The present disclosure relates generally to maps and computer-implemented mapping applications. More particularly, the present disclosure relates to determining a semantic location of a map and proximity between maps.

BACKGROUND

Geographic information systems, mapping applications, navigational devices, and other similar and related products can allow a user to obtain and explore an interactive map by performing actions such as, for example, panning and zooming the map. Many different maps exist which illustrate or otherwise describe the respective locations of various objects, places, roads, political boundaries, geographic features, or items of content.

In particular, as one example, certain existing products can enable a user to customize a map or create a new map, for example, by adding items of content to a base map. Thus, a user can create a new map that shows the locations of various user-specified items of content in a particular geographic region. To provide an example, a user can create a map that shows the locations of currently burning wildfires within a particular geographic area.

In general, maps, including user-generated maps, are useful to convey location information to a person who is viewing the map. For example, the map showing the location of currently burning wildfires can be useful for news reporting purposes, travel planning purposes, or any other purpose for which knowledge of the location of the wildfires is useful. However, for such a map to be useful, a party that is interested in viewing the map must be able to discover and access the map in the first place.

Thus, the existence of such many different maps and, in particular, the ability of users to generate multitudes of new maps, presents certain challenges associated with performing map categorization, map searching, map interrelation, or other map information handling. In particular, techniques are needed to enable search engines to identify maps in response to relevant search criteria, thereby enabling parties interested in viewing the map to search for and discover the map. Likewise, techniques are needed to enable determination of a proximity or inter-relatedness between maps, for example, to enable a user to browse or discover related maps which may convey useful information.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to determine semantic locations for maps. The method includes obtaining, by one or more computing devices, information descriptive of a plurality of content locations respectively associated with a plurality of items of content included in a map. The method includes identifying, by the one or more computing devices, a set of content cells based at least in part on the plurality of content locations respectively associated with the plurality of items of content included in the map. Each cell in the set of content cells corresponds to a particular geographic area that includes one or more of the content locations. The method includes determining, by the one or more computing devices, a plurality of sets of feature cells respectively for a plurality of semantic entities. The set of feature cells associated with each semantic entity is descriptive of a geographic area associated with such semantic entity. The method includes comparing, by the one or more computing devices, the set of content cells to the respective sets of feature cells for at least a portion of the plurality of semantic entities. The method includes selecting, by the one or more computing devices, at least one of the plurality of semantic entities as a semantic location for the map based at least in part on the comparison of the set of content cells to the respective set of feature cells for such at least one semantic entity.

Another example aspect of the present disclosure is directed to a computer system to determine semantic locations for maps. The computer system includes at least one processor and at least one non-transitory computer-readable medium that stores instructions. Execution of the instructions by the at least one processor causes the computer system to: obtain information descriptive of a plurality of content locations respectively associated with a plurality of items of content included in a map; identify a set of content cells based at least in part on the plurality of content locations respectively associated with the plurality of items of content included in the map; determine a plurality of sets of feature cells respectively for a plurality of semantic entities; compare the set of content cells to the respective sets of feature cells for at least a portion of the plurality of semantic entities; and select at least one of the plurality of semantic entities as a semantic location for the map based at least in part on the comparison of the set of content cells to the respective set of feature cells for such at least one semantic entity.

Another example aspect of the present disclosure is directed to one or more non-transitory computer-readable media that store instructions that, when executed by one or more processors, cause the one or more processors to: obtain information descriptive of a first plurality of content locations respectively associated with a first plurality of items of content included in a first map and identify at least one first semantic location for the first map based at least in part on the first plurality of content locations. The first semantic location is a smallest semantic entity that includes greater than a threshold amount of the first plurality of content locations. Execution of the instructions causes the one or more processors to: obtain information descriptive of a second plurality of content locations respectively associated with a second plurality of items of content included in a second map and identify at least one second semantic location for the second map based at least in part on the second plurality of content locations. The second semantic location is the smallest semantic entity that includes greater than the threshold amount of the second plurality of content locations. Execution of the instructions causes the one or more processors to: determine a proximity score between the first map and the second map based at least in part on a comparison of the at least one first semantic location to the at least one second semantic location.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
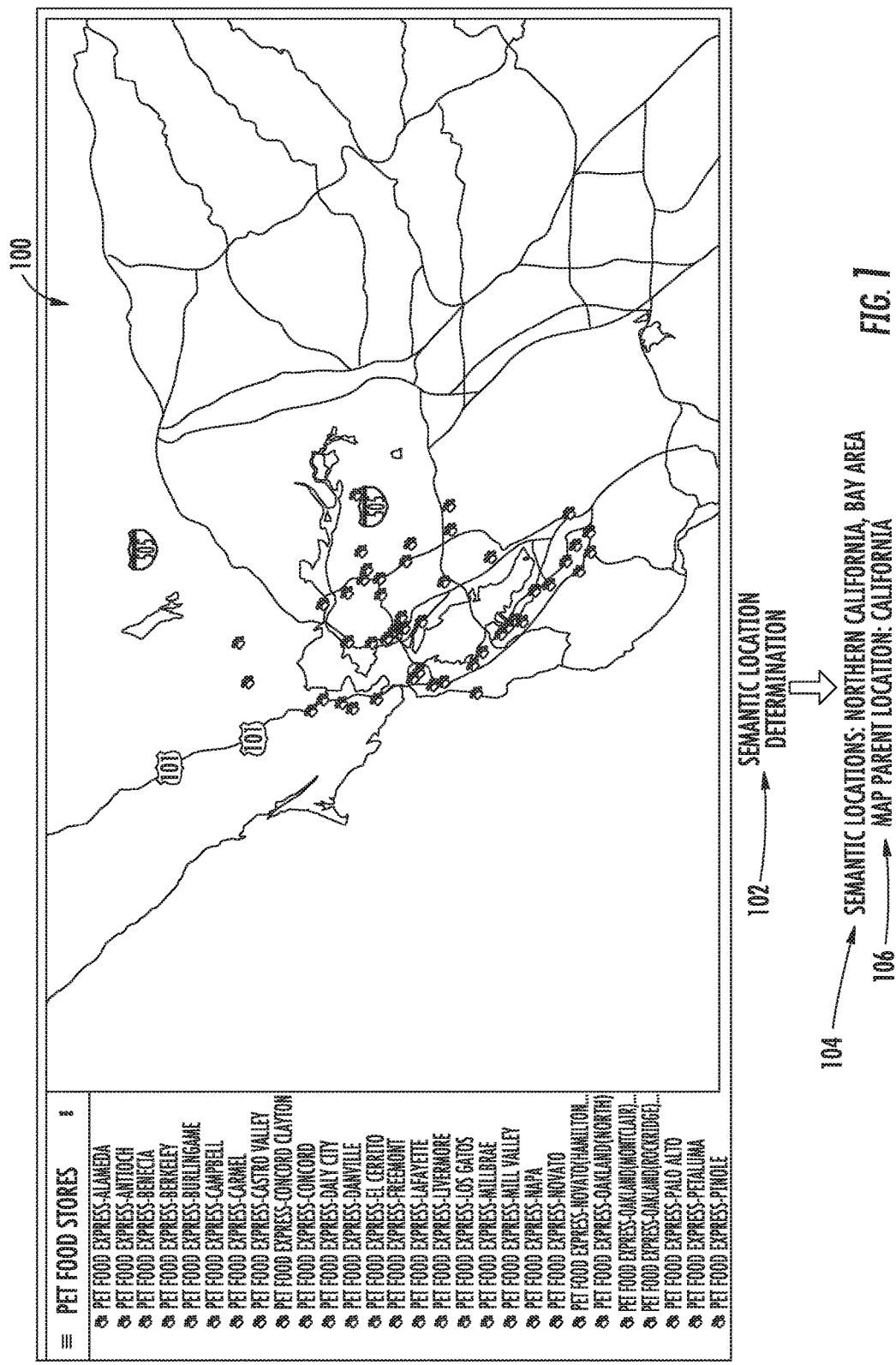
FIG. 1 depicts a graphical diagram of an example semantic location determination performed on an example user-generated map according to example embodiments of the present disclosure.

Generally, the present disclosure is directed to systems and methods that determine a semantic location of a map and/or determine proximity between maps. In particular, the systems and methods described herein can identify and select one or more semantic entities that convey a semantic understanding or semantic summarization of the location of items of content included in a map. The selected semantic entities can be designated as semantic locations for such map. For example, for a map that shows the location of bonsai nurseries throughout England, Scotland, and Northern Ireland, the locations of the items of content can be summarized by selecting and using the semantic entity of "the United Kingdom" as a semantic location for such map. Thus, given a set of content locations associated with items of content included in a map, the systems and methods of the present disclosure can determine one or more semantic locations that provide a semantic understanding or semantic summarization of such set of content locations.

As one example, a computing system of the present disclosure can select or otherwise identify a smallest semantic entity that includes greater than a threshold amount of a plurality of content locations associated with a map. The computing system can associate the identified semantic entity with the map as a semantic location for the map. Semantic locations selected for a map can be used to enable search engines to identify the map in response to relevant search criteria. In another aspect, the systems and methods of the present disclosure can determine a proximity score between a first map and a second map. For example, the systems and methods of the present disclosure can determine the proximity score between the first map and the second map based at least in part on a comparison of at least one first semantic location associated with the first map to at least one second semantic location associated with the second map. The proximity score can be used to determine whether to provide the second map as a related map for the first map.

More particularly, certain existing products can enable a user to customize a map or create a new map, for example, by adding items of content to a base map. One or more locations can be selected or otherwise specified by the user for each item of content. For example, the one or more locations associated with each item of content can take the form of various shapes such as, for example, points, lines, polylines, polygons, or other forms. Thus, a user can create a new map that shows the locations of various user-specified items of content in a particular geographic region. As noted above, the systems and methods of the present disclosure can be applied to determine one or more semantic locations that convey a semantic summarization of the locations of the items of content included in such a user-generated map.

In some implementations, to determine one or more semantic locations for a map, a computing system can obtain information descriptive of a plurality of content locations respectively associated with a plurality of items of content included in the map. For example, the items of content can include one or more of: a point item of content, a line item of content, and a polygon item of content. As one example, a user can add an item of content to a map that describes a location of a bonsai nursery store. Such item of content can be a point item of content since it has a single location associated therewith. As another example, a user can add an item of content to a map that describes a navigational route from an origin to a destination. Such item of content can be a line item of content since it includes one or more lines that form the route. As yet another example, a user can add an item of content to a map that describes the extent to which a wildfire is currently burning. Such item of content can be a polygon item of content since it has an area of locations associated therewith which can described with a polygon.

Thus, a map can have a number of items of content of various types, with each item of content having one or more content locations associated therewith. A database that stores the map can include data that describes each item of content and the content locations respectively associated with such item of content. As one example, the content locations can be stored as pairs of latitude and longitude. As such, a computing system implementing the present disclosure can access such database to obtain information descriptive of the content locations associated with a particular map.

According to an aspect of the present disclosure, the computing system can identify a set of content cells based at least in part on the plurality of content locations obtained for the map. For example, the content cells can be cells that include one or more of the content locations.

More particularly, in some implementations of the present disclosure, at least a portion of the world can be geographically divided into a number of cells that respectively correspond to particular geographic areas. In some implementations, the cells can be organized into a data structure that includes a number of layers of cells, with each cell in each layer corresponding to a number of cells from a higher layer that are of smaller geographic size. For example, in an example quadtree tessellation scheme, each cell can include or otherwise correspond to the same geographic area as four child cells that are included in the next higher layer. Likewise, in such example quadtree tessellation scheme, each cell can be one of four child cells that are included in or otherwise correspond to the same geographic area as a parent cell included in the next lower layer.

Thus, a computing system implementing the present disclosure can include or otherwise have access to a database that describes a plurality of cells organized according to such a data structure. The computing system can designate or otherwise select certain of such cells as content cells based at least in part on the plurality of content locations obtained for the map, thereby forming a set of content cells for the map. Stated differently, the computing system can convert the content locations for the map into a set of content cells, where each cell in the set of content cells corresponds to a particular geographic area that includes one or more of the content locations.

In some implementations, the content cells can be selected from cells within a range of layers between a minimum layer and a maximum layer. For example, the maximum layer and the minimum layer can be variables that are adjustable by a system operator based on desired semantic location size, processing time, or other parameters. In some implementations, the computing system first adds cells (e.g., from the maximum layer) to the set of content cells according to a set of selection principles and then adds all parent cells of any cells that have previously been designated as content cells into the set of content cells.

In particular, in some implementations, the computing system can identify the set of content cells by implementing various different selection principles respectively for the different types of content items. As an example, in some implementations, for each point item of content included in the map, the computing system can designate the cell in at least one cell layer that includes the location associated with the point item of content as a content cell. For example, for each point item of content, the cell at the maximum layer that includes the point item of content's latitude and longitude can be selected as a content cell.

As another example, for each line item of content, the computing system can designate each cell in at least one cell layer that includes any of two or more locations respectively associated with two or more points of the line item of content as included in the set of content cells. For example, each endpoint of the line (and/or inflection point for polylines) can be treated the same as a point item of content as described above. Thus, in such example, cells of the maximum layer that enclose endpoints of the lines will be added to the set of content cells, but not the cells along the line between the two endpoints.

As yet another example, for each polygon item of content, the computing system can designate one or more cells that are entirely included within the polygon item of content as included in the set of content cells. For example, the computing system can determine an interior cell coverage of the polygon between the maximum layer and a minimum layer can be added to the set of content cells. In particular, in one example, the computing system can perform or cause to be performed an interior cell coverage algorithm that determines the interior cell coverage for the polygon. The interior cell coverage algorithm can be an optimization algorithm that minimizes the number of cells used and/or satisfies a maximum number of cells constraint while maximizing the percentage of the polygon that is included within the interior cell coverage. The selected cells can be constrained to be within the range between the maximum layer and the minimum layer. Additional or alternative constraints or objectives can be used as well. The interior coverage of the polygon does not include cells which include locations that are outside the polygon boundary.

One reason for using the interior coverage is to avoid adding neighbor locations in case the polygon item of content represents a certain semantic entity like a country, city, etc. As an example, consider a polygon item of content that follows the boundary of the city of Mountain View, Calif. The complete cell coverage of that polygon covers cells that include overlapping neighbor cities. Thus, simply selecting any and all cells which include any portion of the polygon will cause the content cells to include portions of neighbor cities such as Sunnyvale, Palo Alto, or other neighboring semantic entities. However, selecting only cells that correspond to the interior coverage of the polygon will result in content cells that only include the city of Mountain View.

As noted above, in some implementations, for all content cells identified using the above principles, the computing system can add all parent cells up to the minimum layer to the set of content cells. Since parent cells may end up containing multiple child cells, in some implementations the resulting table can be aggregated by Map ID to the following table: Cell ID→(Map ID, Count).

According to another aspect, a computing system implementing the present disclosure can determine a plurality of sets of feature cells respectively for a plurality of semantic entities. For example, the set of feature cells determined for each semantic entity can be descriptive of a geographic area associated with such semantic entity. Generally, the term semantic entity refers to an entity that has some human context or meaning and that has an associated geographic area. Example semantic entities can include political entities (e.g., cities, counties, states, countries, congressional districts, etc.); continents; bodies of water; regions (e.g., the San Francisco Bay Area, the 1-5 Corridor, the Cascadia Bioregion, the Columbia River Watershed, etc.); parks (e.g., city parks, state parks, national parks); neighborhoods; property boundaries; business entities (e.g., a mall or shopping center, a campus, a factory, a building); various segmentations of geographic area according to various criteria (e.g. according to population demographics); or other geographic areas or places that have some human meaning or context.

In some implementations, the plurality of semantic entities can be organized into a number of levels. For example, the semantic entity of "Utah" may be one level below the semantic entity of "United States of America." In some implementations, the level of a semantic entity can correspond to or otherwise depend on its size. In some implementations, the level of a semantic entity can generally correspond to a type of semantic entity (e.g., a neighborhood may be one level below a city).

As noted above, the computing system can determine a set of feature cells for each of a number of semantic entities. As one example, in some implementations, the computing system can obtain a boundary associated with a semantic entity from a database. For example, a database associated with a geographic information system can provide information descriptive of boundaries for each of the plurality of semantic entities. For example, each boundary can be defined by one or more polygons. In some implementations, the computing system can generate a cell coverage between the minimum layer and the maximum layer for each location included in within the boundary of the semantic entity. In some implementations, the cell coverage can result in the following table: Cell ID→Semantic Entity ID. The cell coverage for a semantic entity can be used as the set of feature cells for such semantic entity.

In particular, in one example, the computing system can perform or cause to be performed a cell coverage algorithm that determines the cell coverage for the semantic entity. The cell coverage algorithm can be an optimization algorithm that minimizes the number of cells used and/or satisfies a maximum number of cells constraint while ensuring that the cell coverage covers an entire geographic area associated with the semantic entity. In addition, the cell coverage algorithm can attempt to minimize an amount of geographic area that is included in the cell coverage but not associated with the semantic entity. The cells selected for the cell coverage can be constrained to be within the range between the maximum layer and the minimum layer. Additional or alternative constraints or objectives can be used as well. The cell coverage of the semantic entity may include cells which include locations that are outside a boundary associated with the semantic entity.

According to another aspect, a computing system implementing the present disclosure can compare the set of content cells to the respective sets of feature cells for at least a portion of the plurality of semantic entities. For example, the computing system can determine, for each semantic entity, a percentage of the set of content cells that are included in the respective set of feature cells for such semantic entity. For example, if the set of feature cells for a particular semantic entity includes two content cells and there are eight content cells total, then the percentage determined for such semantic entity can be twenty-five percent. Measures other than the percentage described above can be used as well.

According to another aspect of the present disclosure, the computing system can select at least one of the plurality of semantic entities as a semantic location for the map based at least in part on the comparison of the set of content cells to the respective set of feature cells for such at least one semantic entity. For example, the computing system can select each semantic entity for which the percentage of the set of content cells that are included in the respective set of feature cells for such semantic entity exceeds a threshold percentage. To provide an example, if the set of feature cells for a particular semantic entity includes six content cells and there are eight content cells total, and if the threshold percentage is fifty percent, then such semantic entity can be selected as a semantic location for the map.

In some instances, maps can be spread across multiple locations. As such, in further implementations of the present disclosure, if there is a small number of semantic entities (e.g., three or less) at the same level that, when combined, exceed the threshold percentage, then each of those semantic entities can selected as a semantic location for the map. Thus, in some implementations, the computing system can identify a combination of two or more semantic entities that share a level and for which the percentage of the set of content cells that are included in a combined set of feature cells for such combination of two or more semantic entities exceeds a threshold value.

In addition, in some instances, semantic entities can be enclosed by parent semantic entities that are just slightly larger (or even identical). For example, the City of San Francisco is nearly the same size as the County of San Francisco. As such, in yet further implementations of the present disclosure, the computing system can identify a parent semantic entity for each semantic entity that has been designated as a semantic location for the map. A size factor can be determined for each identified parent semantic entity. The size factor can describe the size of the geographic area associated with such parent semantic entity relative to the size of the geographic area associated with one or more semantic entities that are children of such parent semantic entity and have been selected as semantic locations for the map. If the size factor for a particular parent semantic entity is less than a threshold factor value (e.g., 1.5), then such parent semantic entity can also be selected as a semantic location for the map.

According to another aspect of the present disclosure, in addition to semantic locations, a map parent location can be selected for a map. For example, a similar technique to that described above can be used to select the map parent location from semantic entities that are larger than the ones identified as semantic locations. As an example, the computing system can identify a map parent location that includes greater than a threshold percentage of the selected semantic locations. The threshold percentage can be the same or a different value than the percentage used to select the semantic locations.

According to yet another aspect, the systems and methods of the present disclosure can determine a proximity score for the map relative to one or more other maps. In particular, in some implementations, a map viewer application that enables a user to view a map can include a Related Maps section, in which one or more related maps are recommended or otherwise identified and/or displayed to the user. Thus, a computing system implementing or otherwise communicating with the map viewer application can use the proximity score for a pair of maps to determine whether to recommend one of the pair of maps to a user that is viewing the other of the pair of maps. For example, the computing system can identify maps to present within the Related Maps section.

In some implementations, the proximity score for a first map and a second map can be based at least in part on one or more first semantic locations associated with the first map and one or more second semantic locations associated with the second map. As described above, the proximity score can be used to determine whether to provide the second map as a related map for the first map.

In some implementations, the proximity score for the first and second maps can be based at least in part on a number of shared neighbor locations between the first semantic locations associated with the first map and the second semantic locations associated with the second map. For example, a neighbor table can define adjacent semantic entities of the same level or type for each semantic entity.

Thus, for proximity score calculation, some or all of the following locations per map can be considered: the semantic locations for each map; the map parent location for each map; and/or the neighbors of the semantic locations for each map. If needed or desired, this list can be extended to add, for example, parent neighbors, neighbor's neighbors, or other potential comparisons.

In particular, according to another aspect of the present disclosure, one example technique to calculate proximity between two maps using two respective sets of map locations (e.g., semantic locations, parent locations, and/or neighbor locations) is to determine a ratio of common locations (e.g., a size of the intersection of the two sets of map locations) over the total number of locations (e.g., a size of a union of the two sets of map locations). Use of such a ratio generates a score between zero and one, which can be useful in a number of circumstances. One possible variation on this technique is to normalize locations by inverse size and/or to weight locations by type (e.g., semantic locations can be weighted stronger than neighbor locations and/or parent locations).

With reference now to the Figures, example embodiments of the present disclosure will be discussed in further detail.

Example Semantic Location Determination

FIG. 1 depicts a graphical diagram of an example semantic location determination performed on an example user-generated map 100 according to example embodiments of the present disclosure. As illustrated, map 100 includes a plurality of items of content which respectively indicate the locations of pet food stores. For example, a user may have used a map generation tool/application to place each of the items of content at a particular location where a pet food store exists. Thus, each item of content can have an associated content location.

The systems and methods of the present disclosure can be implemented to perform a semantic location determination 102 for the map 100. For example, system 200 of FIG. 2 can implement methods 400 and/or 800 to perform semantic location determination 102 for the map 100.

In particular, the semantic location determination 102 results in selection of one or more semantic locations 104 for the map 100. In one example, the one or more semantic locations 104 can be the smallest semantic entities that include greater than a threshold amount of the plurality of content locations respectively associated with the plurality of items of content. For the particular map 100, the selected semantic locations 104 are the semantic entities of "Northern California" and the "San Francisco Bay Area." These semantic locations 104 can be associated with the map (e.g., in a database, as metadata, etc.). The semantic locations 104 can be useful for a number of objectives, including, for example, identification of the map 100 in response to a relevant search query (e.g., "pet food stores in Northern California") and/or determination of a proximity score for one or more other maps relative to the map 100.

In some implementations, in addition to the semantic locations 104, the semantic location determination process 102 can select one or more map parent locations 106 for the map. As illustrated, the map parent location 106 for the map 100 is "California." In some implementations, a technique similar to that used to select the semantic locations 104 can be used to select the map parent location 106 from semantic entities that are larger than the semantic locations 104. As an example, the systems and methods of the present disclosure can identify a map parent location 106 that includes greater than a threshold percentage of the selected semantic locations 104. The threshold percentage can be the same or a different value than the percentage used to select the semantic locations 104.

Example Systems

Figure 2:
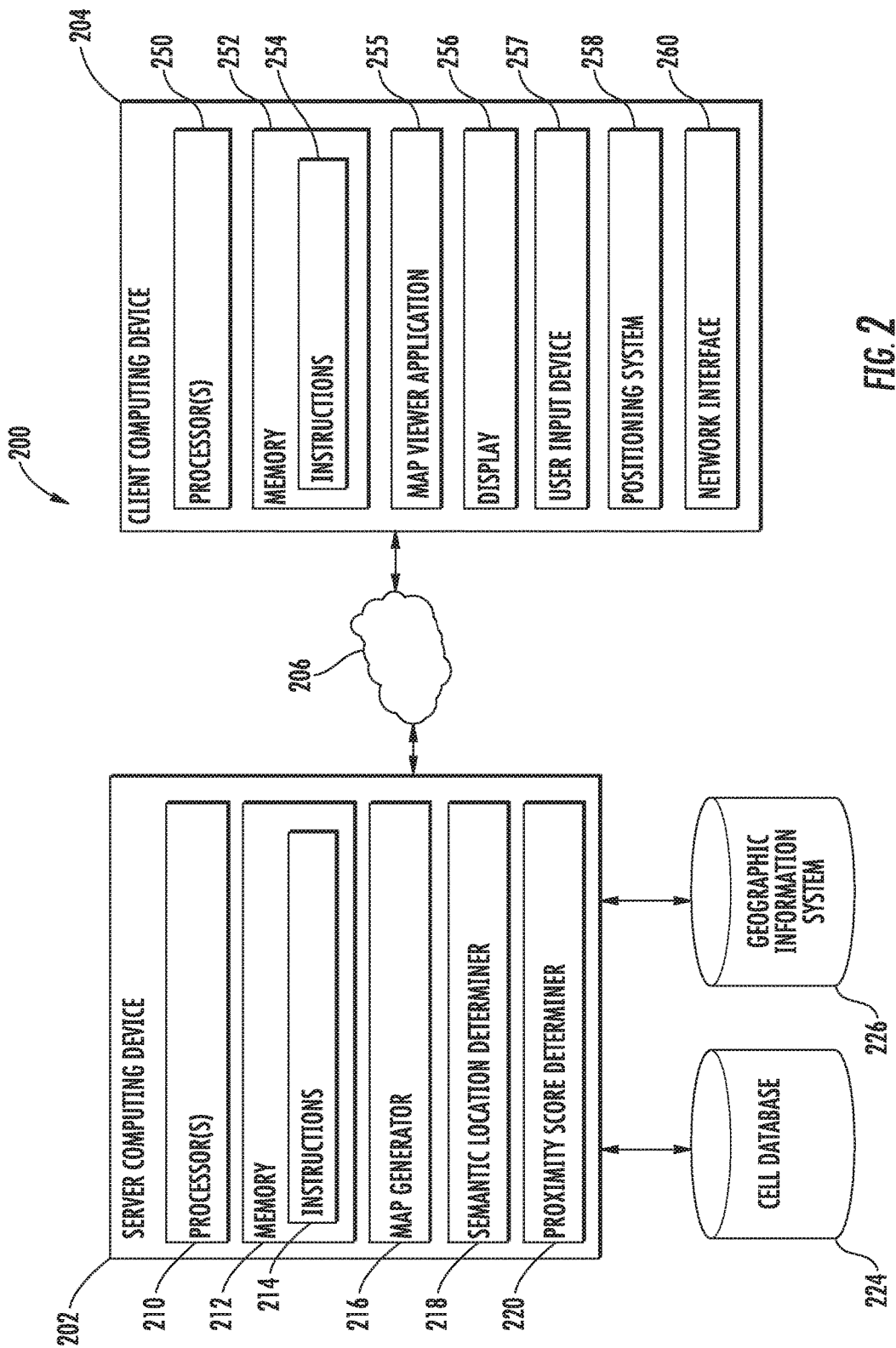
FIG. 2 depicts a block diagram an example computing system to determine semantic locations for maps according to example embodiments of the present disclosure.

FIG. 2 depicts a block diagram an example computing system 200 to determine semantic locations for maps according to example embodiments of the present disclosure. System 200 can include a client-server architecture, where a server 202 communicates with one or more client devices 204 over a network 206. Although a single client device 204 is illustrated in FIG. 2, any number of client devices can be connected to server 202 over network 206.

Server 202 can be implemented using one or more server computing devices. In the instance that server 202 is implemented using a plurality of computing devices, the functionality provided by server 202 can be performed according to any suitable computing architecture, including parallel computing architectures, sequential computing architectures, or some combination thereof.

Server 202 can include one or more processors 210 and one or more memories 212. Processor 210 can be any suitable processing device (e.g. a controller, microcontroller, integrated circuits, central processing units, FPGAs, and/or other processing components) and can be one processor or a plurality of processors which are operatively connected. The one or more memories 212 can be RAM, ROM, flash memory, disk storage, virtual memory, and/or other non-transitory computer-readable media or combinations thereof for storing information or data.

Figure 4:
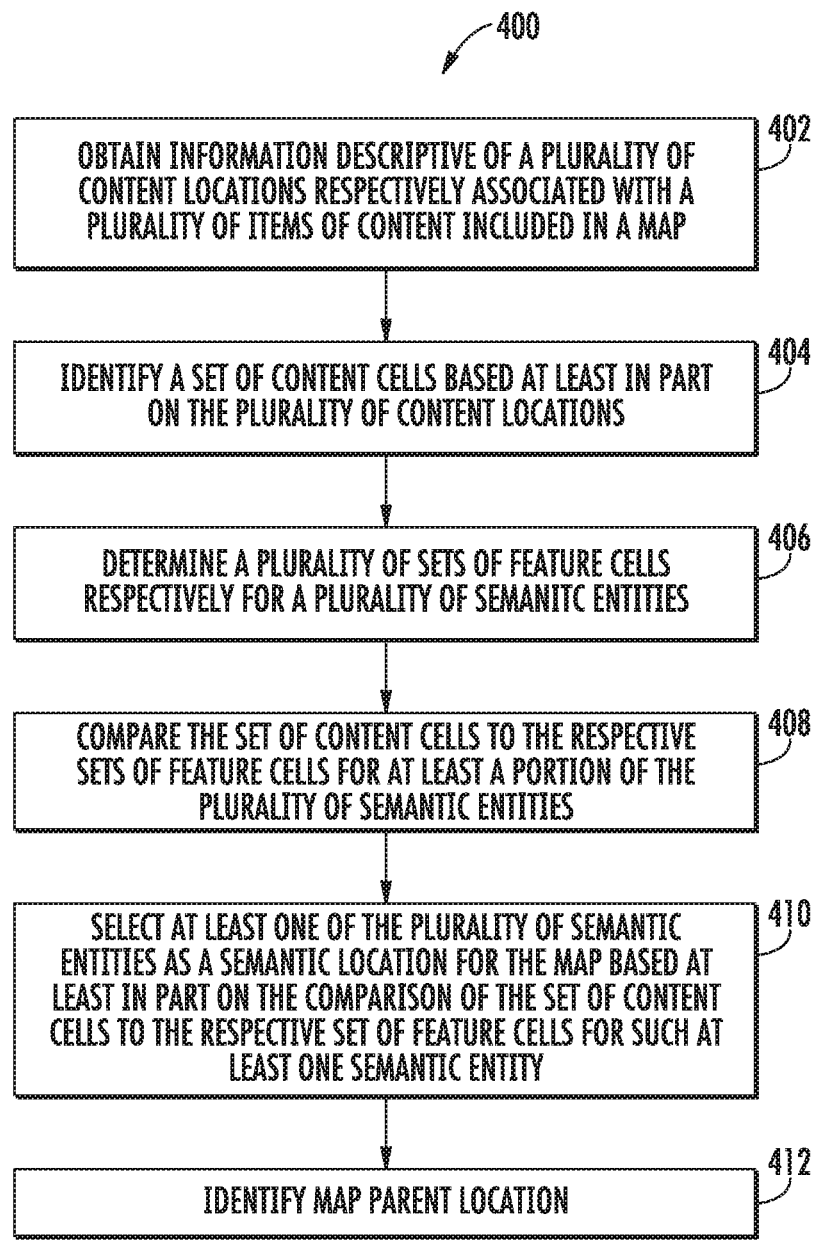
FIG. 4 depicts a flowchart diagram of an example method to determine semantic locations for maps according to example embodiments of the present disclosure.
Figure 8:
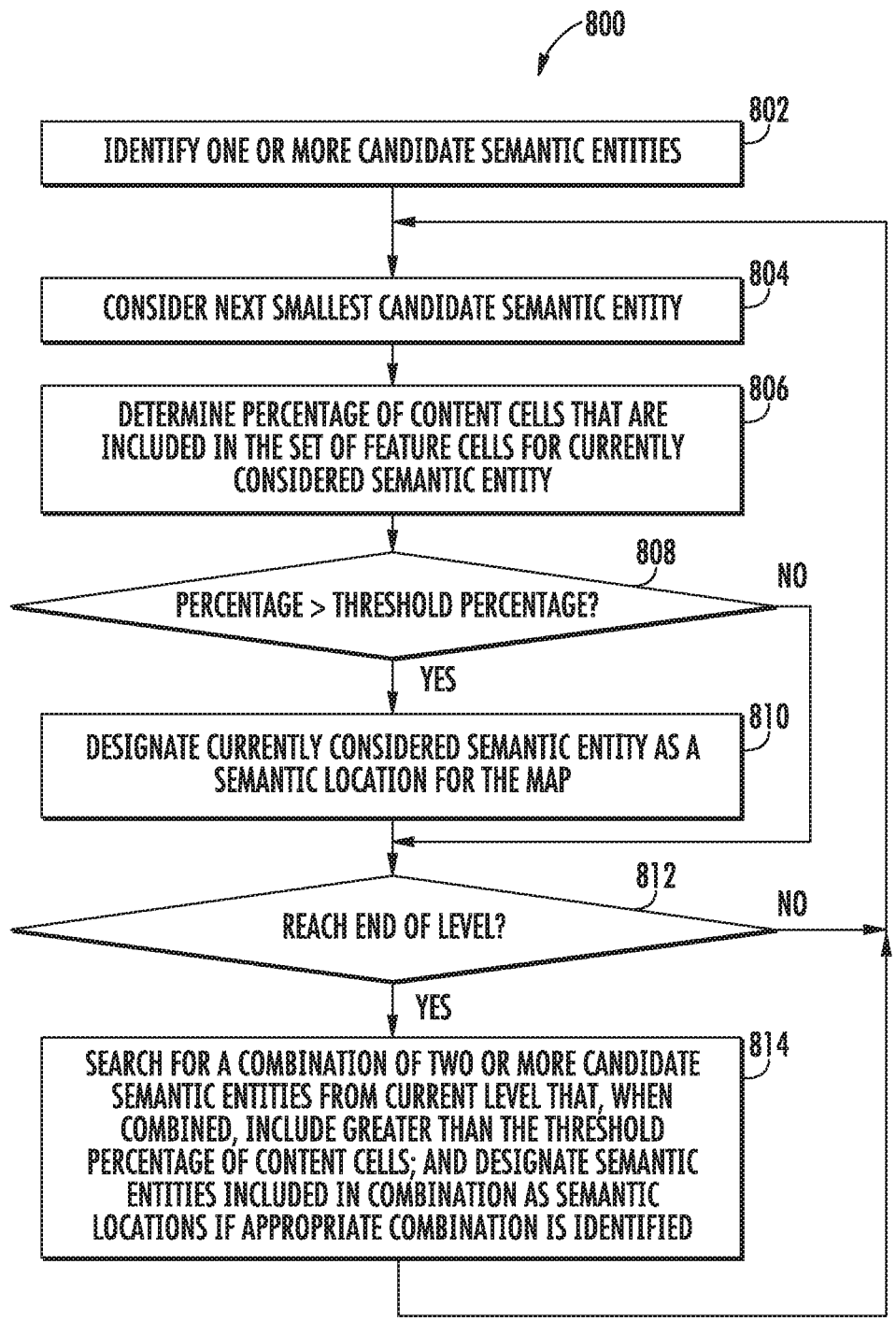
FIG. 8 depicts a flowchart diagram of an example method to determine semantic locations for maps according to example embodiments of the present disclosure.

Memory 212 can store instructions 214 that cause processor 210 to perform operations to implement the present disclosure, including performing aspects of methods 400 and 800 of FIGS. 4 and 8, respectively. Server 202 can communicate with client device 204 over network 206 by sending and receiving data.

Server 202 can also include various components that, when implemented, cause server 202 to perform certain functionality. In particular, in some implementations, server 202 can include a map generator 216, a semantic location determiner 218, and a proximity score determiner 220.

Each of the map generator 216, the semantic location determiner 218, and the proximity score determiner 220 can include computer logic utilized to provide desired functionality. Thus, each of the map generator 216, the semantic location determiner 218, and the proximity score determiner 220 can be implemented in hardware, firmware, and/or software controlling a general purpose processor. In one implementation, each of the map generator 216, the semantic location determiner 218, and the proximity score determiner 220 are program code files stored on the storage device, loaded into memory and executed by a processor or can be provided from computer program products, for example, computer executable instructions that are stored in a tangible computer-readable storage medium such as RAM hard disk or optical or magnetic media.

Server 202 can implement the map generator 216 to generate a map based on user input. For example, server 202 can implement the map generator 216 to enable a user (e.g., via client computing device 204) to customize a map or create a new map, for example, by adding items of content to a base map. One or more locations can be selected or otherwise specified by the user for each item of content. For example, the one or more locations associated with each item of content can take various forms such as, for example, points, lines, polylines, polygons, or other forms. Thus, map generator 216 can enable a user to create a new map that shows the locations of various user-specified items of content in a particular geographic region. The server 202 can store the resulting map in a geographic information system database 226. In particular, the geographic information system database 226 can store a large number of different maps. The maps in the database 226 can include user-generated maps. Additionally or alternatively, the maps in the database 226 can include maps that were not generated by users (e.g., standard maps provided by the entity that operates the geographic information system database 226).

Server 202 can implement the semantic location determiner 218 to determine one or more semantic locations that convey a semantic summarization of the locations of the items of content included in a map. For example, the semantic location determiner 218 can perform some or all of method 400 of FIG. 4 and/or method 800 of FIG. 8 to determine one or more semantic locations for a particular map. The semantic location determiner 218 can perform other techniques described by the present disclosure, as well.

Server 202 can implement the proximity score determiner 220 to determine a proximity score between a pair of maps. For example, the proximity score determiner 220 can perform some or all of method 1100 of FIG. 11.

Server 202 can also provide mapping data to one or more client devices 204. In particular, server 202 can receive requests for certain portions of a map or actions to be taken within a map and, in response, provide map data that implements such requests or actions.

As an example, server 202 can retrieve map data from the geographic information system database 226 and provide the retrieved map data to a client device 204. The map data can be data that the client device 204 uses to visualize or display the map on the display 256 of the client device 204.

The client device 204 can receive user input (e.g. a request for a zoom in operation to be performed). The client device 204 can communicate data describing such user input to the server 202 over network 206. The server 202 respond to the user input by, for example, providing additional map data that the client device 204 uses to render or display the map from a zoomed in perspective. Thus, server 202 can provide various interactive map features via communication of map data to client device 204.

Server 202 can also be coupled to or in communication with one or more databases, including a cell database 224 and a geographic information system database 226. Although databases 224 and 226 are depicted in FIG. 2 as external to server 202, one or more of such databases can be included in memory 212 of server 202. Further, databases 224 and 226 can each correspond to a plurality of databases rather than a single data source. Likewise, in some implementations, databases 224 and 226 together correspond to a single database.

Cell database 224 can store or provide information about a plurality of cells. More particularly, in some implementations of the present disclosure, at least a portion of the world can be geographically divided into a number of cells that respectively correspond to particular geographic areas. In some implementations, the cell database 224 can organize the cells into a data structure that includes a number of layers of cells, with each cell in each layer corresponding to a number of cells from a higher layer that are of smaller geographic size. For example, in an example quadtree tessellation scheme, each cell can include or otherwise correspond to the same geographic area as four child cells that are included in the next higher layer. Likewise, in such example quadtree tessellation scheme, each cell can be one of four child cells that are included in or otherwise correspond to the same geographic area as a parent cell included in the next lower layer.

Thus, the server 202 can include or otherwise have access to cell database 224 that describes a plurality of cells organized according to such a data structure. In particular, as an example, the cell database 224 can provide information that describes, for each cell, one or more corresponding locations (e.g., ranges of latitudes and longitudes or other indications of cell boundaries/location), parent cell relationships, child cell relationships, or other information.

Geographic information system database 226 can store or provide geospatial data to be used by server 202. Exemplary geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data.

In particular, according to an aspect of the present disclosure, the geographic information system database 226 can store or provide information for each of a plurality of semantic entities. Example semantic entities can include political entities (e.g., cities, counties, states, countries, congressional districts, etc.); bodies of water; regions (e.g., the San Francisco Bay Area, the I-5 Corridor, the Cascadia Bioregion, the Columbia River Watershed, etc.); parks (e.g., city parks, state parks, national parks); neighborhoods; property boundaries; business entities (e.g., a mall or shopping center, a campus, a factory, a building); various segmentations of geographic area according to various criteria (e.g. according to population demographics); or other geographic areas or places that have some human meaning or context. As an example, the geographic information system database 226 can provide information that describes, for each semantic entity, one or more corresponding locations (e.g., by describing one or more boundaries of the semantic entity), parent semantic entity relationships, child semantic entity relationships, or other information. For example, the geographic information system database 226 can provide information descriptive of boundaries for each of the plurality of semantic entities. For example, each boundary can be defined by one or more polygons.

In some implementations, the plurality of semantic entities can be organized into a number of levels. For example, the semantic entity of "Utah" may be one level below the semantic entity of "United States of America." In some implementations, the level of a semantic entity can correspond to or otherwise depend on its size. In some implementations, the level of a semantic entity can generally correspond to a type of semantic entity (e.g., a neighborhood may be one level below a city).

Figure 3:
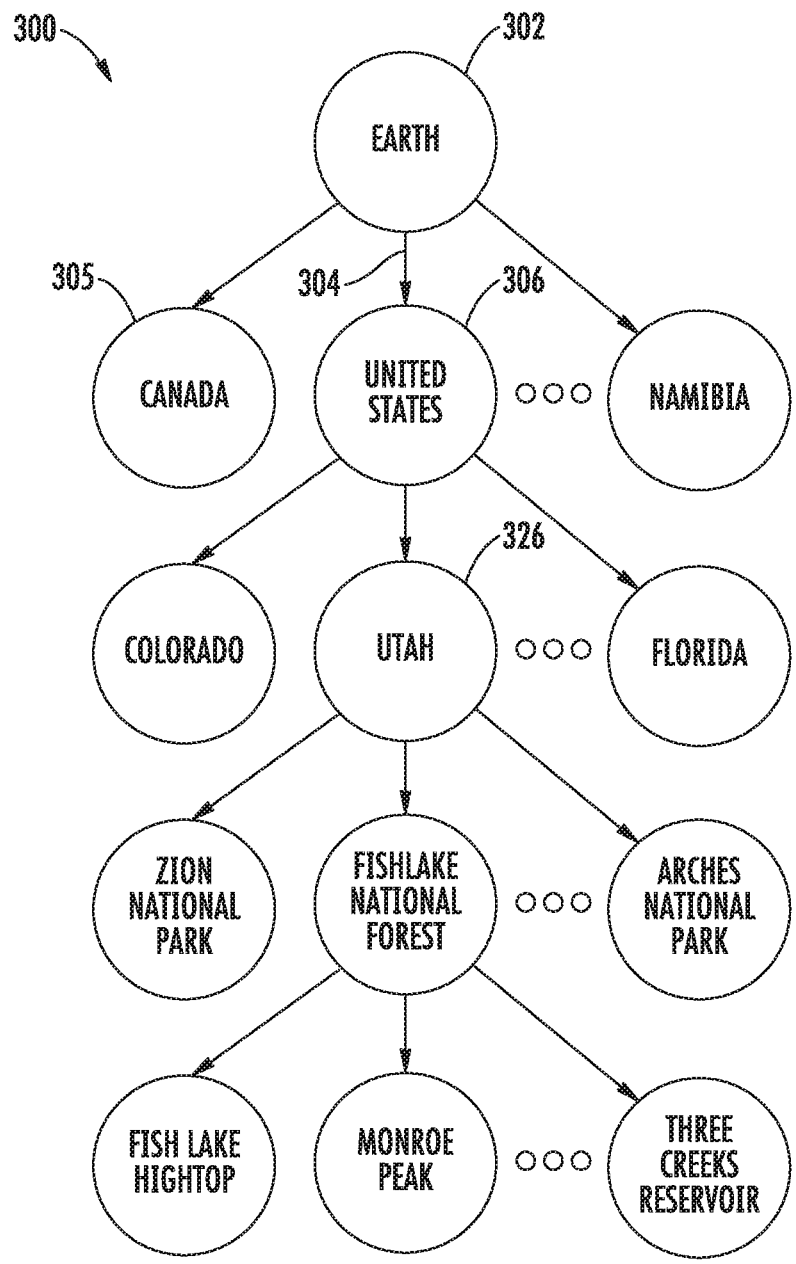
FIG. 3 depicts a graphical diagram of example semantic entities according to example embodiments of the present disclosure.

As one example, FIG. 3 depicts a graphical diagram 300 of example semantic entities according to example embodiments of the present disclosure. In particular, as an example, the diagram 300 illustrates example semantic entities organized into a directed graph that includes a plurality of nodes (e.g. nodes 302, 306, and 326) and directed edges between certain nodes. For example, edge 304 extends from node 302 to node 306. In some implementations, a first node (e.g. node 302) from which an edge is directed to a second node (e.g. node 306) can be viewed as being one level "higher" than the second node. Likewise, in some implementations, the second node can be viewed as being one level "lower" than the first node.

Graphical diagram 300 is provided as one simplified example organization of semantic entities. Many different organizations with different rules and relationships can be used as well. For example, a continent level (e.g., with a node for "North America") could be placed between node 302 and nodes 305 and 306. Likewise, many other levels, entities, relationships, or other organizational schemes could be included in the graphical diagram 300.

Referring again to FIG. 2, the geographic information system database 226 can be used by server 202 to provide navigational directions, perform point of interest searches, provide point of interest location or categorization data, determine distances, routes, or travel times between locations, or other geographic tasks. In some implementations, the geospatial data provided by geographic information system 226 can be organized into a plurality of different cells that correspond to respective geographic areas, as described with reference to cell database 224.

Client device 204 can be a computing device having a processor 250 and a memory 252, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, or other such devices/systems. In short, client device 204 can be any computer, device, or system that can interact with the server 202 (sending and receiving data) to implement the present disclosure.

Processor 250 can be any suitable processing device (e.g. a controller, microcontroller, integrated circuits, central processing units, FPGAs, and/or other processing components) and can be one processor or a plurality of processors which are operably connected. The memory 252 can be RAM, ROM, flash memory, disk storage, virtual memory, and/or other non-transitory computer-readable components for storing information or data, or some combination thereof. Memory 252 can include instructions 254 that, when implemented by processor 250, cause client device 204 to perform operations consistent with the present disclosure.

Client computing device 204 can include a map viewer application 255 which allows the user to view, interact with, and/or create a map. For example, the map viewer application 255 can be browser application and/or a client device portion of a mapping application.

Client device 204 can include a display 256 and a user input device 257. Display 256 can be any component or grouping of components for displaying information, such as a map. User input device 257 can be any component or grouping of components for receiving user input including, for example, a mouse, keyboard, touch screen, microphone, and/or other input devices.

In some implementations, client device 204 can further include a positioning system 258. Positioning system 258 can determine a current geographic location of client device 204 and communicate such geographic location to server 202 over network 206. The positioning system 258 can be any device or circuitry for analyzing the position of the client device 204. For example, the positioning system 258 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

Client device 204 can further include a network interface 260. Network interface 260 can include any suitable components for interfacing with one more networks, including for example, transmitters, receivers, ports, controllers, antennas, or other suitable components.

Network 206 can be any type of communications network, such as a local area network (e.g., intranet), wide area network (e.g., Internet), or some combination thereof and can include any number of wired or wireless links. In general, communication between the server 202 and a client device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In addition, although system 200 of FIG. 2 employs a client-server architecture, system 200 is provided for the purposes of example only and is not necessarily required to practice the present disclosure. For example, the present disclosure can be implemented by a single computing device executing instructions from memory or can be implemented by a computing system that is different that the example system 200.

Example Methods

FIG. 4 depicts a flowchart diagram of an example method 400 to determine semantic locations for maps according to example embodiments of the present disclosure. Although method 400 will be discussed with reference to the example computing system 200 of FIG. 2, any suitable computing system can implement the method 400.

At 402, the computing system obtains information descriptive of a plurality of content locations respectively associated with a plurality of items of content included in a map. For example, the server 202 can obtain information descriptive of a plurality of content locations associated with a map from the geographic information system database 226.

In some implementations, the items of content can include one or more of: a point item of content, a line item of content, and a polygon item of content. As one example, a user can add an item of content to a map that describes a location of a bonsai nursery store. Such item of content can be a point item of content since it has a single location associated therewith. As another example, a user can add an item of content to a map that describes a navigational route from an origin to a destination. Such item of content can be a line item of content since it includes one or more lines that form the route. As yet another example, a user can add an item of content to a map that describes the extent to which a wildfire is currently burning. Such item of content can be a polygon item of content since it has an area of locations associated therewith which can described with a polygon.

Thus, a map can have a number of items of content of various types, with each item of content having one or more content locations associated therewith. A database that stores the map can include data that describes each item of content and the content locations respectively associated with such item of content. As one example, the content locations can be stored as pairs of latitude and longitude. As such, a computing system implementing the present disclosure can access such database to obtain information descriptive of the content locations associated with a particular map.

At 404, the computing system identifies a set of content cells based at least in part on the plurality of content locations. The content cells can be cells that include one or more of the content locations. For example, the server 202 can obtain information that describes a plurality of cells from the cell database 224. The computing system can designate or otherwise select certain of such cells as content cells based at least in part on the plurality of content locations obtained for the map, thereby forming a set of content cells for the map. Stated differently, the computing system can convert the content locations for the map into a set of content cells, where each cell in the set of content cells corresponds to a particular geographic area that includes one or more of the content locations.

In some implementations, the content cells can be selected from cells within a range of layers between a minimum layer and a maximum layer. For example, the maximum layer and the minimum layer can be variables that are adjustable by a system operator based on desired semantic location size, processing time, or other parameters. In some implementations, the computing system first adds cells (e.g., from the maximum layer) to the set of content cells according to a set of selection principles and then adds all parent cells of any cells that have previously been designated as content cells into the set of content cells.

In particular, in some implementations, the computing system can identify the set of content cells by implementing various different selection principles respectively for the different types of content items. As an example, in some implementations, for each point item of content included in the map, the computing system can designate the cell in at least one cell layer that includes the location associated with the point item of content as a content cell. For example, for each point item of content, the cell at the maximum layer that includes the point item of content's latitude and longitude can be selected as a content cell.

As another example, for each line item of content, the computing system can designate each cell in at least one cell layer that includes any of two or more locations respectively associated with two or more points of the line item of content as included in the set of content cells. For example, each endpoint of the line (and/or inflection point for polylines) can be treated the same as a point item of content as described above. Thus, in such example, cells of the maximum layer that enclose endpoints of the lines will be added to the set of content cells, but not the cells along the line between the two endpoints.

As yet another example, for each polygon item of content, the computing system can designate one or more cells that are entirely included within the polygon item of content as included in the set of content cells. For example, the computing system can determine an interior cell coverage of the polygon between the maximum layer and a minimum layer can be added to the set of content cells. In particular, in one example, the computing system can perform or cause to be performed an interior cell coverage algorithm that determines the interior cell coverage for the polygon. The interior cell coverage algorithm can be an optimization algorithm that minimizes the number of cells used and/or satisfies a maximum number of cells constraint while maximizing the percentage of the polygon that is included within the interior cell coverage. The selected cells can be constrained to be within the range between the maximum layer and the minimum layer. Additional or alternative constraints or objectives can be used as well. The interior coverage of the polygon does not include cells which include locations that are outside the polygon boundary.

One reason for using the interior coverage is to avoid adding neighbor locations in case the polygon item of content represents a certain semantic entity like a country, city, etc. As an example, consider a polygon item of content that follows the boundary of the city of Mountain View, Calif. The complete cell coverage of that polygon covers cells that include overlapping neighbor cities. Thus, simply selecting any and all cells which include any portion of the polygon will cause the content cells to include portions of neighbor cities such as Sunnyvale, Palo Alto, or other neighboring semantic entities. However, selecting only cells that correspond to the interior coverage of the polygon will result in content cells that only include the city of Mountain View.

As noted above, in some implementations, for all content cells identified using the above principles, the computing system can add all parent cells up to the minimum layer to the set of content cells. Since parent cells may end up containing multiple child cells, in some implementations the resulting table can be aggregated by Map ID to the following table: Cell ID→(Map ID, Count).

Figure 5:
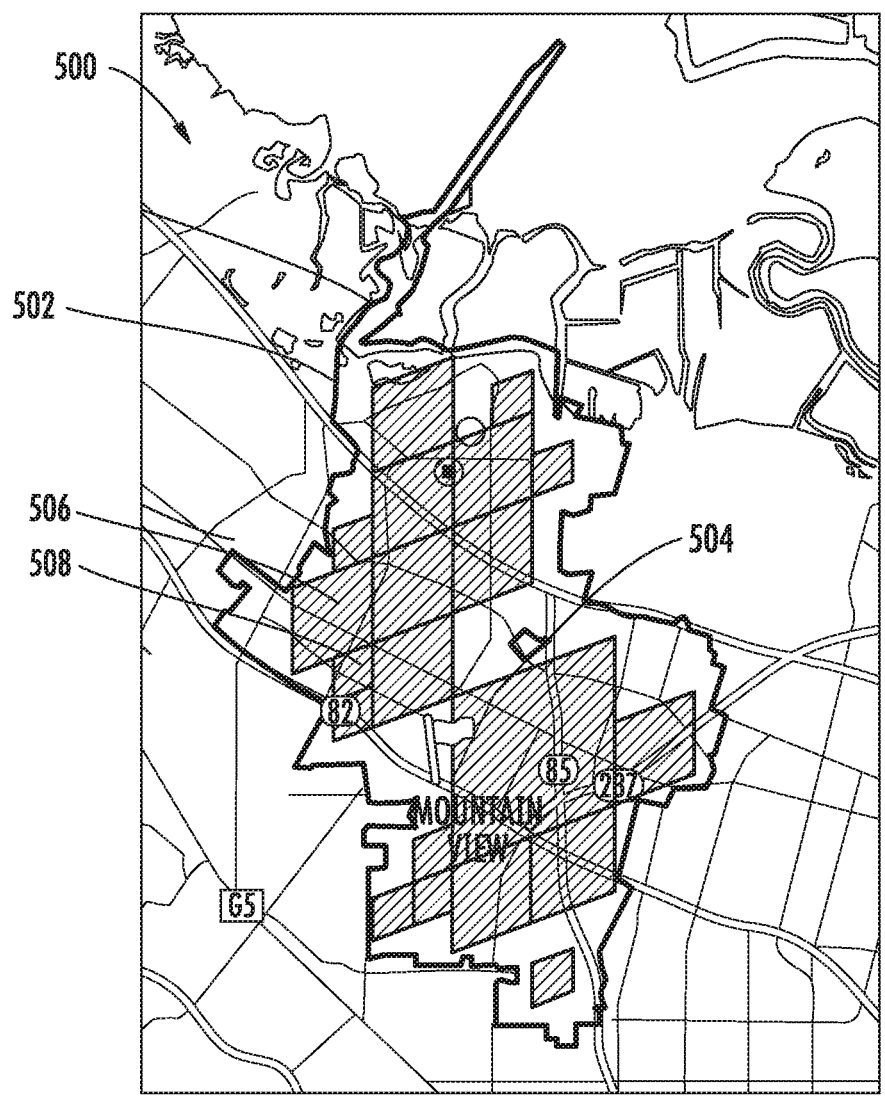
FIG. 5 depicts a graphical diagram of an example set of content cells for an example polygonal item of content according to example embodiments of the present disclosure.

As one example, FIG. 5 depicts a graphical diagram 500 of an example set of content cells (e.g., cells 506 and 508) for an example polygonal item of content according to example embodiments of the present disclosure. In particular, diagram 500 illustrates cells that are included in an interior cell coverage that has been determined for the polygonal item of content. As illustrated, the interior cell coverage includes only cells (e.g., cells 506 and 508) that are within the boundaries 502 and 504 of the polygonal item of content. The example polygonal item of content illustrated in diagram 500 happens to have boundaries 502 and 504 that mirror the boundary of the city of Mountain View, Calif. In some implementations, additional cells that are not illustrated in FIG. 5 can be added to the set of content cells for the illustrated example polygonal item of content. For example, each parent cell to the cells illustrated can be added up to the minimum cell layer.

Referring again to FIG. 4, at 406, the computing system determines a plurality of sets of feature cells respectively for a plurality of semantic entities. For example, the server 202 can obtain information about the boundaries respectively associated with a plurality of semantic entities from the geographic information system database 226.

In some implementations, the computing system can generate a cell coverage between the minimum layer and the maximum layer for each location included in within the boundary of the semantic entity. In some implementations, the cell coverage can result in the following table: Cell ID→Semantic Entity ID. The cell coverage for a semantic entity can be used as the set of feature cells for such semantic entity.

In particular, in one example, the computing system can perform or cause to be performed a cell coverage algorithm that determines the cell coverage for the semantic entity. The cell coverage algorithm can be an optimization algorithm that minimizes the number of cells used and/or satisfies a maximum number of cells constraint while ensuring that the cell coverage covers an entire geographic area associated with the semantic entity. In addition, the cell coverage algorithm can attempt to minimize an amount of geographic area that is included in the cell coverage but not associated with the semantic entity. The cells selected for the cell coverage can be constrained to be within the range between the maximum layer and the minimum layer. Additional or alternative constraints or objectives can be used as well. The cell coverage of the semantic entity may include cells which include locations that are outside a boundary associated with the semantic entity.

Figure 6:
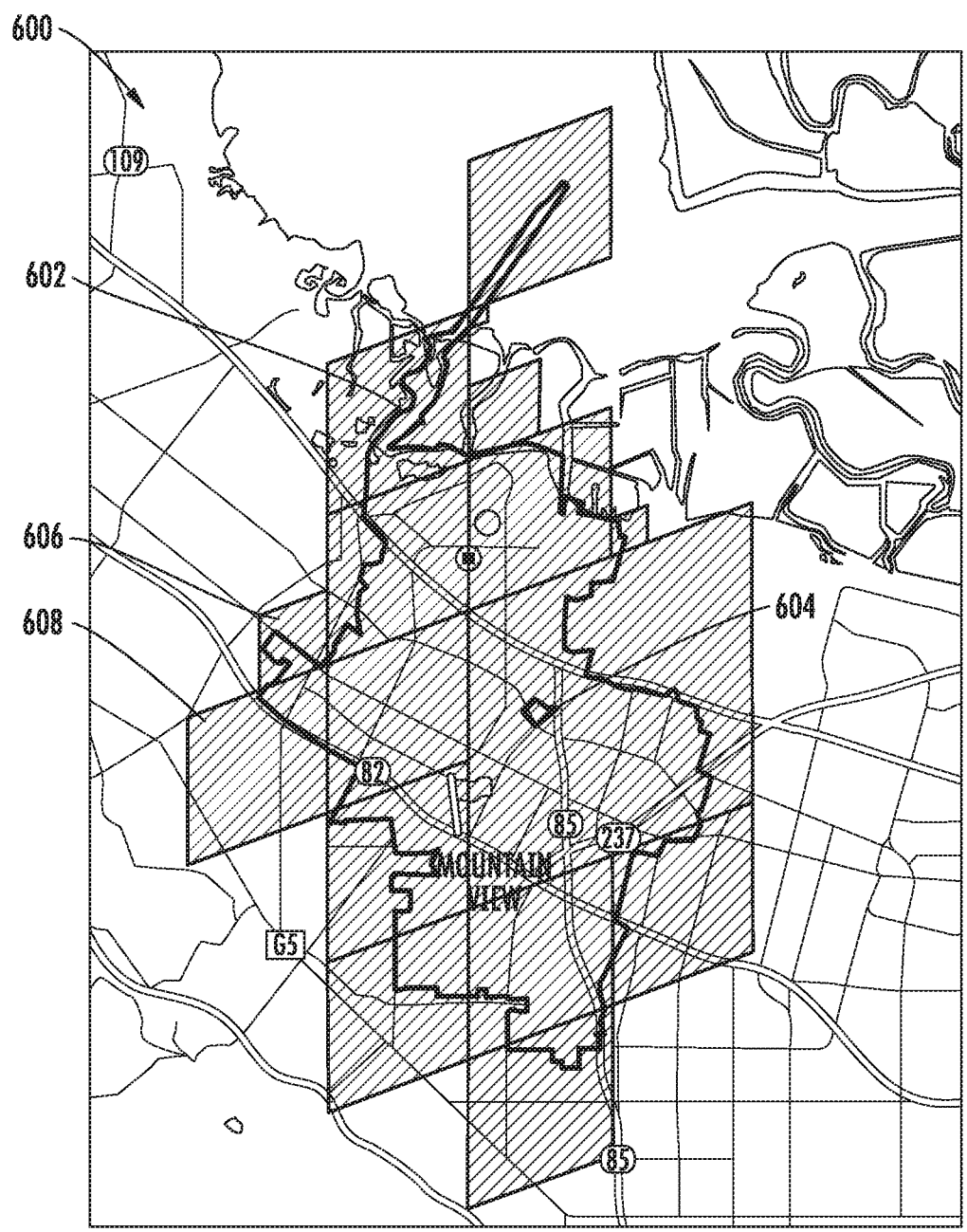
FIG. 6 depicts a graphical diagram of an example set of feature cells for an example semantic entity according to example embodiments of the present disclosure.

As one example, FIG. 6 depicts a graphical diagram 600 of an example set of feature cells for an example semantic entity according to example embodiments of the present disclosure. In particular, diagram 600 illustrates cells that are included in a cell coverage that has been determined for the semantic entity of "Mountain View, Calif." The geographic area associated with the semantic entity of Mountain View, Calif. can be described with boundaries 602 and 604. As illustrated, the cell coverage can include cells (e.g., cells 606 and 608) that include geographic areas that are not within the boundary 602 associated with the semantic entity.

Figure 7:
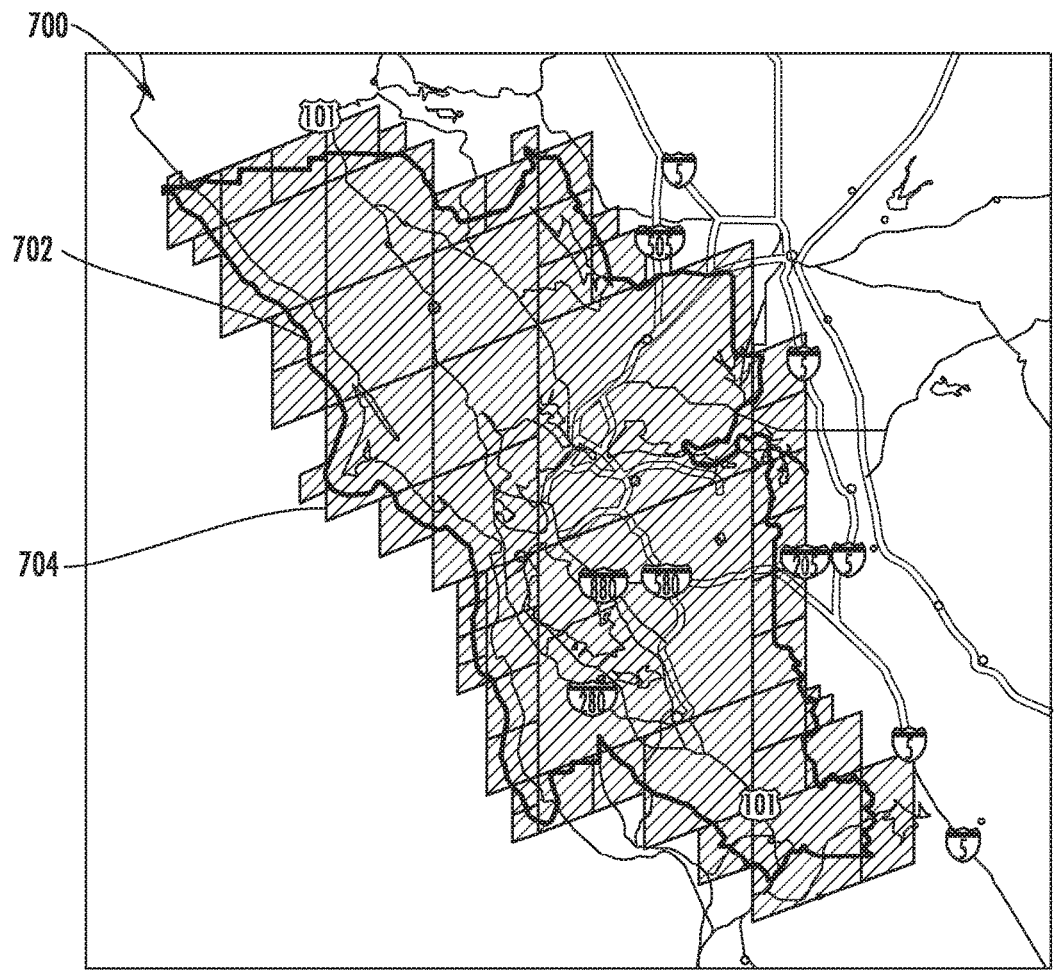
FIG. 7 depicts a graphical diagram of an example set of feature cells for an example semantic entity according to example embodiments of the present disclosure.

As another example, FIG. 7 depicts a graphical diagram 700 of an example set of feature cells for an example semantic entity according to example embodiments of the present disclosure. In particular, diagram 700 illustrates cells that are included in a cell coverage that has been determined for the semantic entity of "San Francisco Bay Area." The geographic area associated with San Francisco Bay Area can be described with boundary 702. As illustrated, the cell coverage can include cells (e.g., cell 704) that include geographic areas that are not within the boundary 702 associated with the semantic entity.

Referring again to FIG. 4, at 408, the computing system compares the set of content cells to the respective sets of feature cells for at least a portion of the plurality of semantic entities. For example, the computing system can determine, for each semantic entity, a percentage of the set of content cells that are included in the respective set of feature cells for such semantic entity. For example, if the set of feature cells for a particular semantic entity includes two content cells and there are eight content cells total, then the percentage determined for such semantic entity can be twenty-five percent. Measures other than the percentage described above can be used as well.

At 410, the computing system selects at least one of the plurality of semantic entities as a semantic location for the map based at least in part on the comparison of the set of content cells to the respective set of feature cells for such at least one semantic entity. For example, the computing system can select each semantic entity for which the percentage of the set of content cells that are included in the respective set of feature cells for such semantic entity exceeds a threshold percentage. Stated differently, the percentage can refer to the number of content cells included in the set of feature cells, divided by the total number of content cells of the map. To provide an example, if the set of feature cells for a particular semantic entity includes six content cells and there are eight content cells total for the map, and if the threshold percentage is fifty percent, then such semantic entity can be selected as a semantic location for the map since the percentage for such particular semantic entity is seventy-five percent, which is greater than the threshold of fifty percent.

In some instances, maps can be spread across multiple locations. As such, in further implementations of the present disclosure, if there is a small number of semantic entities (e.g., three or less) at the same level that, when combined, exceed the threshold percentage, then each of those semantic entities can selected as a semantic location for the map. Thus, in some implementations, the computing system can identify a combination of two or more semantic entities that share a level and for which the percentage of the set of content cells that are included in a combined set of feature cells for such combination of two or more semantic entities exceeds a threshold value.

In addition, in some instances, semantic entities can be enclosed by parent semantic entities that are just slightly larger (or even identical). For example, the City of San Francisco is nearly the same size as the County of San Francisco. As such, in yet further implementations of the present disclosure, the computing system can identify a parent semantic entity for each semantic entity that has been designated as a semantic location for the map. A size factor can be determined for each identified parent semantic entity. The size factor can describe the size of the geographic area associated with such parent semantic entity relative to the size of the geographic area associated with one or more semantic entities that are children of such parent semantic entity and have been selected as semantic locations for the map. If the size factor for a particular parent semantic entity is less than a threshold factor value (e.g., 1.5), then such parent semantic entity can also be selected as a semantic location for the map.

At 412, the computing system identifies a map parent location for the map. For example, a similar technique to that described above can be used to select the map parent location from semantic entities that are larger than the ones identified as semantic locations. As an example, the computing system can identify a map parent location that includes greater than a threshold percentage of the selected semantic locations. The threshold percentage can be the same or a different value than the percentage used to select the semantic locations.

FIG. 8 depicts a flowchart diagram of an example method 800 to determine semantic locations for maps according to example embodiments of the present disclosure. In particular, method 800 provides one technique to perform blocks 408 and 410 of method 400 of FIG. 4. Method 800 is provided as one example only.

At 802, a computing system identifies one or more candidate semantic entities. In some implementations, the computing system can identify one or more candidate semantic entities by joining the set of content cells and the plurality of sets of feature cells based on Cell ID and then grouping by Map ID. For example, joining the sets of cells can performed using the following operations:

Join based on Cell ID, output re-keyed by Semantic Entity ID, as follows: Semantic Entity ID→(Map ID, Count);

Convert table to be keyed by pair Semantic Entity ID/Map ID, as follows: (Map ID, Semantic Entity ID)→Count;

Aggregate table by key, to get total number of cells per map and semantic entity, as follows: (Map ID, Semantic Entity ID)→Count;

Convert table to be keyed by Map ID, as follows: Map ID→(Semantic Entity ID, Count); and Aggregate table by Map ID, break down value to lists of semantic entity/count pairs by semantic entity type, as follows: Map ID→{(Semantic Entity Type, {(Semantic Entity ID, Count)})}.

Figure 9:
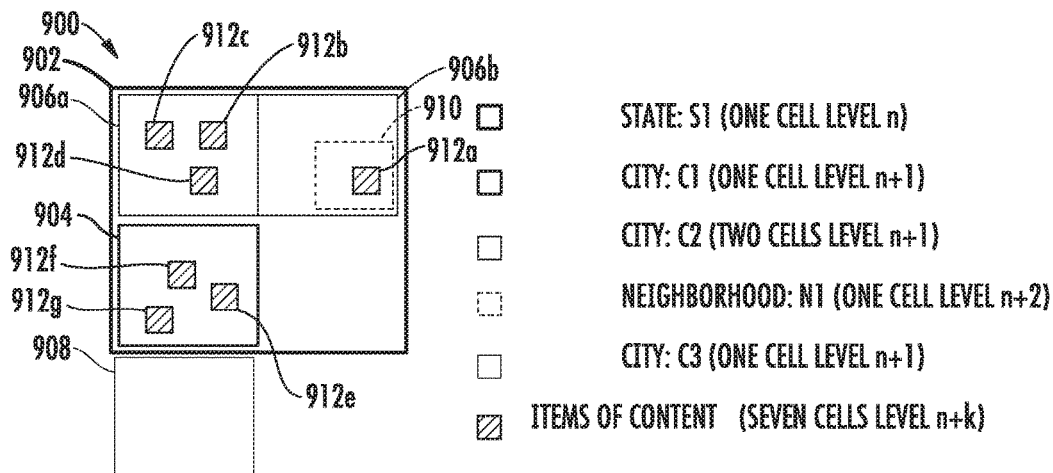
FIG. 9 depicts a graphical diagram of an example set of content cells and example sets of feature cells according to example embodiments of the present disclosure.

To illustrate one example of this cell joining technique, FIG. 9 depicts a graphical diagram 900 of an example set of content cells and example sets of feature cells according to example embodiments of the present disclosure. A first semantic entity "State S1" includes one feature cell 902 at layer n; a second semantic entity "City C1" includes one feature cell 904 at layer n+1; a third semantic entity "City C2" includes two feature cells 906a-b at layer n+1; a fourth semantic entity "City C3" includes one cell 908 at layer n+1; a fifth semantic entity "Neighborhood N1" includes one feature cell 910 at layer n+2; and the map includes items of content that have resulted in seven content cells 912a-g at layer n+k. The graphical diagram 900 is provided to illustrate one example technique only and is not a limiting demonstration.

Joining the set of cells illustrated in FIG. 9 according to the joining technique described above results in the following list of semantic entity/count pairs, organized by semantic entity type:

Map ID→{(Neighborhood, {(N1, 1)}), (City, {(C1, 3), (C2, 4)}), (State, {(S1, 7)})}.

Each semantic entity included in the above list can be referred to as a Map Feature or a candidate semantic location. The remainder of method 800 can be performed to select one or more of the candidate semantic locations as semantic locations that best represent the location of the map.

In particular, referring again to FIG. 8, at 804, the computing system considers the next smallest candidate semantic entity. In particular, method 800 can iterate over the candidate semantic entity in ascending order of entity size. Thus, at the first instance of 804, the smallest semantic entity (or first semantic entity in the smallest entity level) can be considered. For example, with reference to FIG. 9, the Neighborhood N1 could be considered first.

At 806, the computing system determines a percentage of the content cells that are included in the set of feature cells for the currently considered semantic entity. For example, in the example of FIG. 9, the set of feature cells for Neighborhood N1 includes only one out of seven of the content cells (14.3%).

At 810, it is determined whether the percentage of the content cells that are included in the set of feature cells for the currently considered semantic entity exceeds a threshold percentage. One example threshold is 80%. If it is determined that the percentage does not exceed the threshold percentage, then the method 800 proceeds to 812. However, if it is determined that the percentage does exceed the threshold percentage, then method 800 proceeds to 810. At 810, the computing system designates the currently considered semantic entity as a semantic location for the map.

At 812, the computing system determines whether the end of a level has been reached. For example, with reference to the example of FIG. 9, after considering Neighborhood N1, the end of the Neighborhood level or type would be reached. Likewise, after considering City C2, the end of the City level or type would be reached.

If it is determined at 812 that the end of the level has not been reached, then method 800 returns to 804 and considers the next smallest candidate semantic entity. However, if it is determined at 812 that the end of a level has been reached, then method 800 proceeds to 814.

At 814, the computing system searches for a combination of two or more candidate semantic entities from the current level that, when combined, include greater than the threshold percentage of content cells. If any such combinations are identified, all candidate semantic entities included in the combination can be designated as semantic locations.

To provide one example with reference to FIG. 9, the feature cells of City C1 include three of seven content cells (42.9%), while the feature cells of City C2 include four of seven content cells (57.1%). Using an example threshold percentage of 80%, neither City C1 nor City C2 would individually quality for selection as semantic locations. However, when combined, the combined set of feature cells for City C1 and City 2 include seven of seven content cells (100%), which exceeds the example threshold percentage of 80%. Therefore, City C1 and City C2 could be designated as semantic locations for the map at 814.

In some implementations, blocks 812 and 814 are performed only if no semantic locations have been selected from the current level. In some implementations, potential combinations are constrained to include less than or equal to a certain maximum number of semantic entities (e.g., 3). In some implementations, potential combinations are constrained to include only semantic entities that are neighbors to at least one other semantic entity included in the combination.

After 814, method 800 returns to 804 and considers the next smallest candidate semantic entity, if any remain.

Figure 11:
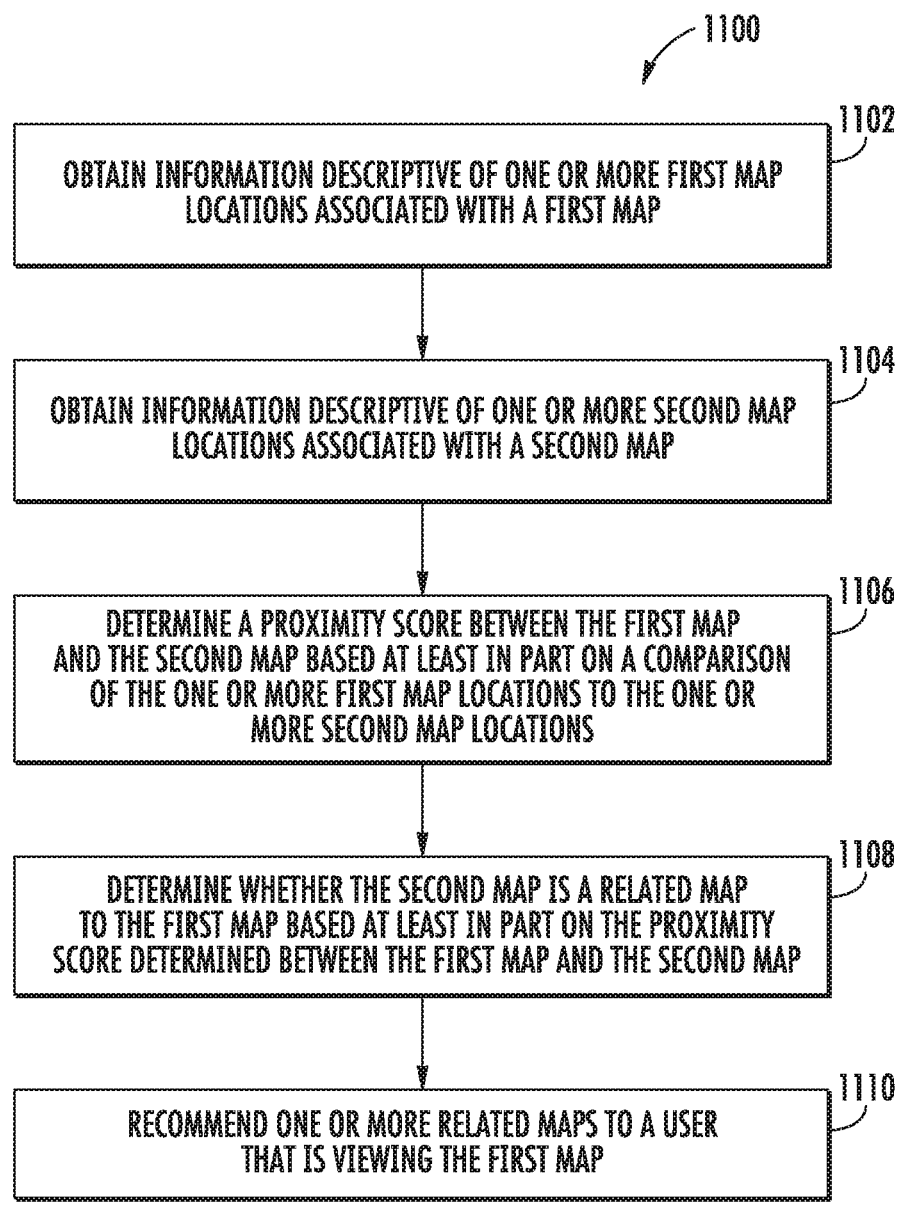
FIG. 11 depicts a flowchart diagram of an example method to determine and use a proximity score between a pair of maps according to example embodiments of the present disclosure.

FIG. 11 depicts a flowchart diagram of an example method 1100 to determine and use a proximity score between a pair of maps according to example embodiments of the present disclosure.

At 1102, a computing system obtains information descriptive of one or more first map locations associated with a first map. For example, the map locations associated with the first map can include semantic locations, parent locations, and/or neighbor locations. Some or all of the map locations may have been determined for the first map by performing method 400 and/or method 800.

At 1104, the computing system obtains information descriptive of one or more second map locations associated with a second map. For example, the map locations associated with the second map can include semantic locations, parent locations, and/or neighbor locations. Some or all of the map locations may have been determined for the second map by performing method 400 and/or method 800.

At 1106, the computing system determines a proximity score between the first map and the second map based at least in part on a comparison of the one or more first map locations to the one or more second map locations.

Thus, for proximity score calculation, some or all of the following locations per map can be considered: the semantic locations for each map; the map parent location for each map; and/or the neighbors of the semantic locations for each map. If needed or desired, this list can be extended to add, for example, parent neighbors, neighbor's neighbors, or other potential comparisons.

Figure 10:
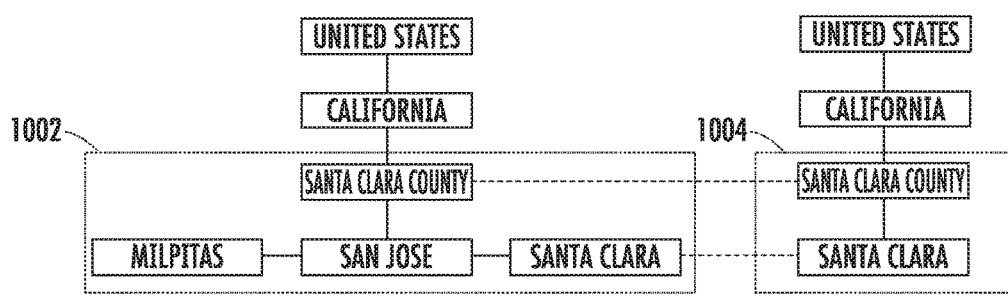
FIG. 10 depicts a graphical diagram of an example comparison of example map locations according to example embodiments of the present disclosure.

In particular, according to another aspect of the present disclosure, one example technique to calculate proximity between two maps using two respective sets of map locations (e.g., semantic locations, parent locations, and/or neighbor locations) is to determine a ratio of common locations (e.g., a size of the intersection of the two sets of map locations) over the total number of locations (e.g., a size of a union of the two sets of map locations). Use of such a ratio generates a score between zero and one, which can be useful in a number of circumstances. One possible variation on this technique is to normalize locations by inverse size and/or to weight locations by type (e.g., semantic locations can be weighted stronger than neighbor locations and/or parent locations As one example, FIG. 10 depicts a graphical diagram of an example comparison of example map locations according to example embodiments of the present disclosure. In particular, a first set of map locations 1002 for a first map can be compared to a second set of map locations 1004 for a second map. The first set of map locations 1002 has a semantic location of San Jose, a map parent location of Santa Clara County, and neighbor locations of Milpitas and Santa Clara (others have been omitted for ease of description). The second map has a semantic location of Santa Clara and a map parent location of Santa Clara County. Certain neighbor locations have been omitted for ease of description.

Using the ratio calculation technique described above, the proximity score for the first map and the second map is larger than zero (since they share the same parent and have some map locations in common), and less than one (since they do not share all neighbors, e.g., San Jose has a neighbor Milpitas which Santa Clara does not have).

Referring again to FIG. 11, at 1108, the computing system determines whether the second map is a related map to the first map based at least in part on the proximity score determined between the first map and the second map.

At 1110, the computing system recommends one or more related maps to a user that is viewing the first map. For example, a certain number maps that have the largest proximity scores relative to the first map can be selected as related maps to be shown to the user that is viewing the first map.

Figure 12:
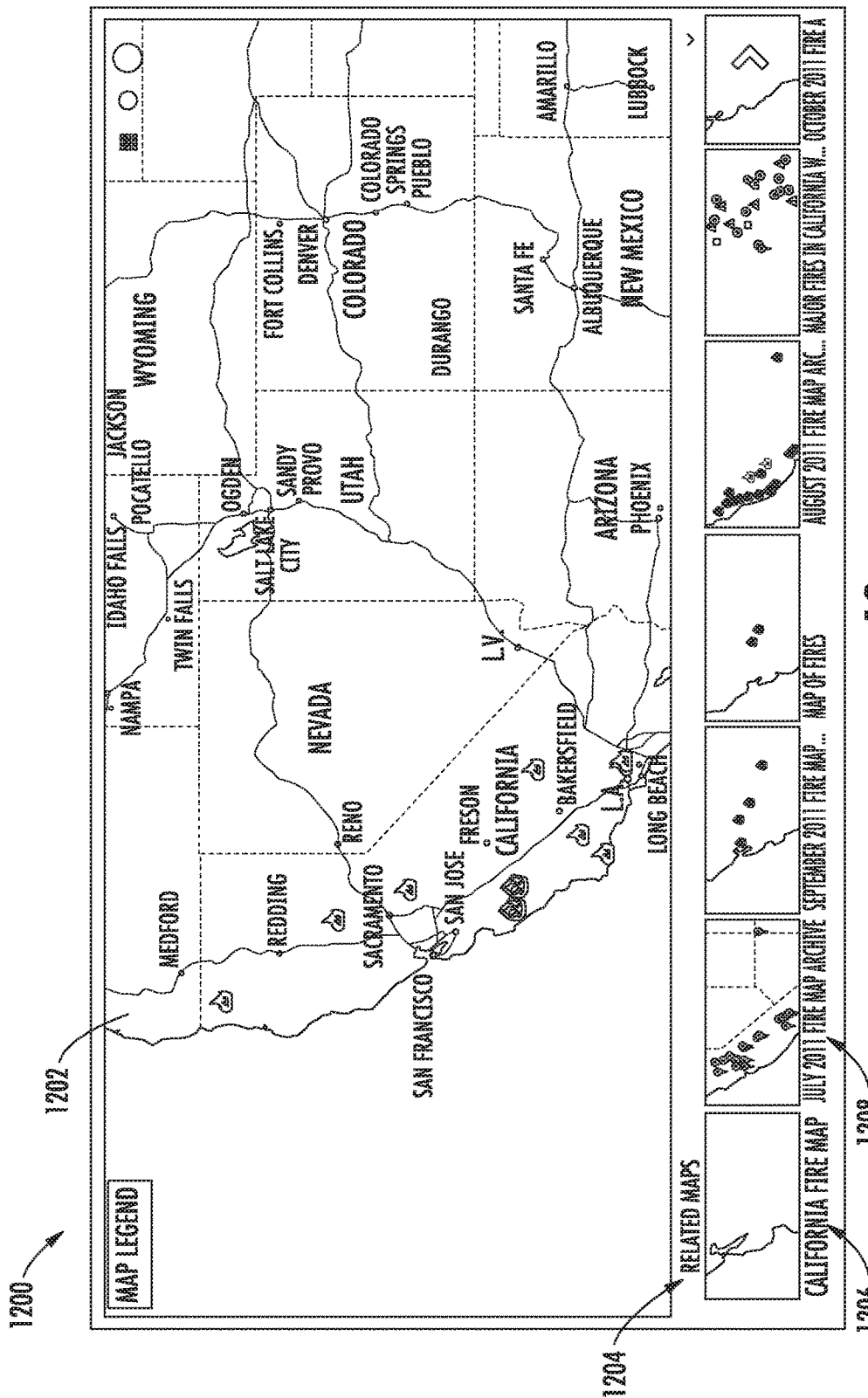
FIG. 12 depicts a graphical diagram of an example user interface that includes an example related maps section according to example embodiments of the present disclosure.

As an example, FIG. 12 depicts a graphical diagram of an example user interface 1200 that includes an example related maps section 1204 according to example embodiments of the present disclosure. The related maps section 1204 can be used to recommend one or more maps (e.g., map 1206 and map 1208) that are related to a first map 1202 that the user is currently viewing. For example, the maps presented in the related maps section 1204 can be selected on the basis of their proximity scores relative to the first map 1202.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4, 8, and 11 respectively depict steps performed in a particular order for purposes of illustration and discussion, the methods of the present disclosure are not limited to the particularly illustrated order or arrangement. The various steps of the methods 400, 800, and 1100 can be omitted, rearranged, combined, and/or adapted in various ways without deviating from the scope of the present disclosure.

What is claimed is:

1. A computer-implemented method to determine semantic locations for maps, the method comprising:
   obtaining, by one or more computing devices, information descriptive of a plurality of content locations respectively associated with a plurality of items of content included in a map;
   identifying, by the one or more computing devices, a set of content cells based at least in part on the plurality of content locations respectively associated with the plurality of items of content included in the map, wherein each cell in the set of content cells corresponds to a particular geographic area that includes one or more of the content locations;
   determining, by the one or more computing devices, a plurality of sets of feature cells respectively for a plurality of semantic entities, wherein the set of feature cells associated with each semantic entity is descriptive of a geographic area associated with such semantic entity;
   comparing, by the one or more computing devices, the set of content cells to the respective sets of feature cells for at least a portion of the plurality of semantic entities, wherein comparing, by the one or more computing devices, the set of content cells to the respective sets of feature cells for at least the portion of the plurality of semantic entities comprises determining, by the one or more computing devices, for each semantic entity in the portion of the plurality of semantic entities, a percentage of the set of content cells that are included in the respective set of feature cells for such semantic entity; and
   selecting, by the one or more computing devices, at least one of the plurality of semantic entities as a semantic location for the map based at least in part on the comparison of the set of content cells to the respective set of feature cells for such at least one semantic entity, wherein selecting, by the one or more computing devices, at least one of the plurality of semantic entities as the semantic location for the map comprises selecting, by the one or more computing devices as the semantic location for the map, each semantic entity for which the percentage of the set of content cells that are included in the respective set of feature cells for such semantic entity exceeds a threshold percentage.

2. The computer-implemented method of claim 1, wherein:
   the plurality of items of content comprise one or more of: a point item of content, a line item of content, and a polygon item of content; and
   identifying, by the one or more computing devices, the set of content cells based at least in part on the plurality of content locations comprises:
   for each point item of content, designating, by the one or more computing devices, a cell in at least one cell layer that includes a location associated with the point item of content as included in the set of content cells;
   for each line item of content, designating, by the one or more computing devices, each cell in the at least one cell layer that includes any of two or more locations respectively associated with two or more endpoints of the line item of content as included in the set of content cells; and
   for each polygon item of content:
   determining, by the one or more computing devices, an interior cell coverage for at least one polygonal boundary associated with the polygon item of content; and
   designating, by the one or more computing devices, each cell included in the interior cell coverage as included in the set of content cells.

3. The computer-implemented method of claim 1, wherein identifying, by the one or more computing devices, the set of content cells based at least in part on the plurality of content locations comprises:
   obtaining, by the one or more computing devices, data descriptive of a plurality of cells that respectively correspond to a plurality of geographic areas, wherein the plurality of cells are classified into a plurality of layers;

designating, by the one or more computing devices, one or more cells from a maximum layer that correspond to one or more of the content locations as included in the set of content cells; and for each layer between the maximum layer and a minimum layer, designating, by the one or more computing devices, each cell that is a parent to one or more cells have previously been designated as content cells as included in the set of content cells.

4. The computer-implemented method of claim 1, further comprising:

identifying, by the one or more computing devices, a parent semantic entity for one or more semantic entities that have been designated as the semantic location for the map;

determining, by the one or more computing devices, a size factor for each parent semantic entity, the size factor for each parent semantic entity describing a size of a geographic area associated with such parent semantic entity relative to the size of the one or more semantic entities that are children to such parent semantic entity and have been selected as semantic locations; and selecting, by the one or more computing device, each parent semantic entity that has a size factor that is less than a threshold factor value as an additional semantic location for the map.

5. The computer-implemented method of claim 1, further comprising:

identifying, by the one or more computing devices, a map parent location that includes greater than a threshold percentage of the selected semantic locations.

6. The computer-implemented method of claim 1, further comprising:

providing, by the one or more computing devices, the at least one semantic location selected for the map to a search engine for use by the search engine in a determination of the relevance of the map in response to a search query.

7. One or more non-transitory computer-readable media that store instructions that, when executed by one or more processors, cause the one or more processors to:

obtain information descriptive of a first plurality of content locations respectively associated with a first plurality of items of content included in a first map;

identify at least one first semantic location for the first map based at least in part on the first plurality of content locations, wherein the first semantic location comprises a smallest semantic entity that includes greater than a threshold amount of the first plurality of content locations;

obtain information descriptive of a second plurality of content locations respectively associated with a second plurality of items of content included in a second map;

identify at least one second semantic location for the second map based at least in part on the second plurality of content locations, wherein the second semantic location comprises the smallest semantic entity that includes greater than the threshold amount of the second plurality of content locations; and determine a proximity score between the first map and the second map based at least in part on a comparison of the at least one first semantic location to the at least one second semantic location.

8. The one or more non-transitory computer-readable media of claim 7, wherein to determine the proximity score between the first map and the second map, the one or more processors:

determine at least a first parent location for the first map;

determine at least a second parent location for the second map; and determine the proximity score between the first map and the second map based at least in part on the comparison of the at least one first semantic location to the at least one second semantic location and based at least in part on a comparison of the first parent location to the second parent location.

9. The one or more non-transitory computer-readable media of claim 7, wherein to determine the proximity score between the first map and the second map, the one or more processors:

identify at least one first neighbor location for the first map;

identify at least one second neighbor location for the second map; and determine the proximity score between the first map and the second map based at least in part on the comparison of the at least one first semantic location to the at least one second semantic location and based at least in part on a comparison of the at least one first neighbor location to the at least one second neighbor location.

10. The one or more non-transitory computer-readable media of claim 7, wherein to determine the proximity score between the first map and the second map, the one or more processors:

identify one or more common map locations between the first map and the second map based at least in part on the comparison of the at least one first semantic location to the at least one second semantic location;

determine a total number of map locations for the first map and the second map;

calculate a ratio of the common map locations to the total number of map locations; and determine the proximity score between the first map and the second map based at least in part on the ratio.

11. A computer-implemented method to determine semantic locations for maps, the method comprising:

obtaining, by one or more computing devices, information descriptive of a plurality of content locations respectively associated with a plurality of items of content included in a map;

identifying, by the one or more computing devices, a set of content cells based at least in part on the plurality of content locations respectively associated with the plurality of items of content included in the map, wherein each cell in the set of content cells corresponds to a particular geographic area that includes one or more of the content locations;

determining, by the one or more computing devices, a plurality of sets of feature cells respectively for a plurality of semantic entities, wherein the set of feature cells associated with each semantic entity is descriptive of a geographic area associated with such semantic entity, and wherein each of the plurality of semantic entities has a respective level associated therewith;

comparing, by the one or more computing devices, the set of content cells to the respective sets of feature cells for at least a portion of the plurality of semantic entities; and selecting, by the one or more computing devices, at least one of the plurality of semantic entities as a semantic location for the map based at least in part on the comparison of the set of content cells to the respective set of feature cells for such at least one semantic entity, wherein selecting, by the one or more computing devices, at least one of the plurality of semantic entities as the semantic location for the map comprises:

identifying, by the one or more computing devices, a combination of two or more semantic entities that share a level and for which a percentage of the set of content cells that are included in a combined set of feature cells for such combination of two or more semantic entities exceeds a threshold percentage; and designating, by the one or more computing devices, the two or more semantic entities included in the combination as semantic locations for the map.

12. A computer-implemented method to determine semantic locations for maps, the method comprising:

obtaining, by one or more computing devices, information descriptive of a plurality of content locations respectively associated with a plurality of items of content included in a map;

identifying, by the one or more computing devices, a set of content cells based at least in part on the plurality of content locations respectively associated with the plurality of items of content included in the map, wherein each cell in the set of content cells corresponds to a particular geographic area that includes one or more of the content locations;

determining, by the one or more computing devices, a plurality of sets of feature cells respectively for a plurality of semantic entities, wherein the set of feature cells associated with each semantic entity is descriptive of a geographic area associated with such semantic entity;

comparing, by the one or more computing devices, the set of content cells to the respective sets of feature cells for at least a portion of the plurality of semantic entities;

selecting, by the one or more computing devices, at least one of the plurality of semantic entities as a semantic location for the map based at least in part on the comparison of the set of content cells to the respective set of feature cells for such at least one semantic entity;

identifying, by the one or more computing devices, a parent semantic entity for one or more semantic entities that have been designated as the semantic location for the map;

determining, by the one or more computing devices, a size factor for each parent semantic entity, the size factor for each parent semantic entity describing a size of a geographic area associated with such parent semantic entity relative to the size of the one or more semantic entities that are children to such parent semantic entity and have been selected as semantic locations; and selecting, by the one or more computing device, each parent semantic entity that has a size factor that is less than a threshold factor value as an additional semantic location for the map.

13. A computer-implemented method to determine semantic locations for maps, the method comprising:

obtaining, by one or more computing devices, information descriptive of a plurality of content locations respectively associated with a plurality of items of content included in a map;

identifying, by the one or more computing devices, a set of content cells based at least in part on the plurality of content locations respectively associated with the plurality of items of content included in the map, wherein each cell in the set of content cells corresponds to a particular geographic area that includes one or more of the content locations;

determining, by the one or more computing devices, a plurality of sets of feature cells respectively for a plurality of semantic entities, wherein the set of feature cells associated with each semantic entity is descriptive of a geographic area associated with such semantic entity;

comparing, by the one or more computing devices, the set of content cells to the respective sets of feature cells for at least a portion of the plurality of semantic entities;

selecting, by the one or more computing devices, at least one of the plurality of semantic entities as a semantic location for the map based at least in part on the comparison of the set of content cells to the respective set of feature cells for such at least one semantic entity; and determining, by the one or more computing devices, a plurality of proximity scores relative to the map respectively for a plurality of second maps, the proximity score for each second map based at least in part on the semantic locations selected for the map and one or more second semantic locations associated with such second map.

14. The computer-implemented method of claim 13, further comprising:

identifying, by the one or more computing devices, at least one of the plurality of second maps as a related map based at least in part on the proximity scores for the plurality of second maps; and recommending, by the one or more computing devices, the related map to a user that is viewing the map.

15. The computer-implemented method of claim 13, wherein the proximity score for each second map is further based at least in part on a number of shared neighbor locations between the semantic locations selected for the map and the one or more second semantic locations associated with such second map.

* * * * *